United States Patent
Dill (10) Patent No.: US 11,390,337 B2
(45) Date of Patent: *Jul. 19, 2022

(54) ANTI-ROLL OVER TRAILER IMPROVEMENTS

(71) Applicant: DCB Trailer Design, LLC, Hawley, TX (US)

(72) Inventor: Blake Dill, Abilene, TX (US)

(73) Assignee: DCB Trailer Design, LLC, Hawley, TX (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/737,866

(22) Filed: Jan. 8, 2020

(65) Prior Publication Data

US 2020/0140023 A1     May 7, 2020

Related U.S. Application Data

(63) Continuation-in-part of application No. 16/554,085, filed on Aug. 28, 2019, now Pat. No. 11,241,991, which is a continuation of application No. 15/400,783, filed on Jan. 6, 2017, now Pat. No. 10,435,089.

(60) Provisional application No. 62/789,572, filed on Jan. 8, 2019.

(51) Int. Cl.
*B62D 53/06* (2006.01)
*B60P 3/22* (2006.01)

(52) U.S. Cl.
CPC ............ *B62D 53/06* (2013.01); *B60P 3/2205* (2013.01); *B60P 3/2225* (2013.01); *B62D 53/061* (2013.01)

(58) Field of Classification Search
CPC ..... B62D 53/06; B62D 53/061; B60P 3/2205; B60P 3/2225
USPC ....................................................... 296/182.1
See application file for complete search history.

(56) References Cited

U.S. PATENT DOCUMENTS

| | | |
|---|---|---|
| 2,339,303 A | 1/1944 | Franklin |
| 3,880,438 A | 4/1975 | Klein |
| 3,883,148 A | 5/1975 | Miller |
| 4,331,342 A | 5/1982 | Lely |
| 5,593,070 A | 1/1997 | Steadman |
| 5,782,493 A | 7/1998 | Bolton et al. |
| 6,394,533 B1 | 5/2002 | Ladell et al. |
| 8,523,232 B2 | 9/2013 | DeLaRosa et al. |

(Continued)

FOREIGN PATENT DOCUMENTS

| | | |
|---|---|---|
| CN | 202806522 U | 3/2013 |
| JP | 2007099192 A | 4/2007 |
| JP | 2013184725 A | 9/2013 |

*Primary Examiner* — D Glenn Dayoan
*Assistant Examiner* — Dana D Ivey
(74) *Attorney, Agent, or Firm* — Johnston IP Law, PLLC (57) ABSTRACT

A trailer configured to lower an overall center of gravity thereof. The trailer comprises a tank, a wheel assembly, a height and a length. The tank comprises a cavity contained within a lower body, a tilted body, a front end and a rear end. The lower body comprises a lower body height, a lower body length, a lower body ground clearance and a lower center of gravity. The tilted body comprises a tilted body ground clearance, a tilted body length, the height and a tilted portion center of gravity. The tank comprises the length, a height equal to the height of the tilted body, and a ground clearance equal to the lower body ground clearance.

16 Claims, 6 Drawing Sheets

(56) References Cited

U.S. PATENT DOCUMENTS

| | | | |
|---|---|---|---|
| 8,801,040 B2 * | 8/2014 | Thomas | B60P 3/221 |
| | | | 280/837 |
| 10,435,089 B2 * | 10/2019 | Dill | B60P 3/2205 |
| 2016/0193950 A1 | 7/2016 | Kibler | |
| 2019/0381927 A1 * | 12/2019 | Dill | B60P 3/24 |

* cited by examiner

ANTI-ROLL OVER TRAILER IMPROVEMENTS

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant

BRIEF SUMMARY OF THE INVENTION

A trailer configured to lower an overall center of gravity thereof. Said trailer comprises a tank, a wheel assembly, a height and a length. Said tank comprises a cavity contained within a lower body, a tilted body, a front end and a rear end. Said lower body comprises a lower body height, a lower body length, a lower body ground clearance and a lower center of gravity. Said tilted body comprises a tilted body ground clearance, a tilted body length, said height and a tilted portion center of gravity. Said tank comprises said length, a height equal to said height of said tilted body, and a ground clearance equal to said lower body ground clearance. Said cavity is configured to contain a fluid. Said lower body height of said lower body is lower than said height of said tilted body. Said tilted body ground clearance is a minimum height to selectively mate with a vehicle. Said tilted body comprises an incline angle relative to said lower body. Said lower body is substantially horizontal. Said tilted body extends up, toward said front end, and does not bend again after bending up from a horizontal plane.

Said trailer configured to lower an overall center of gravity thereof. Said trailer comprises said tank, said wheel assembly, said height and said length. Said tank comprises said cavity contained within said lower body, said tilted body, said front end and said rear end. Said lower body comprises said lower body height, said lower body length, said lower body ground clearance and said lower center of gravity. Said tilted body comprises said tilted body ground clearance, said tilted body length, said height and said tilted portion center of gravity. Said tank comprises said length, a height equal to said height of said tilted body, and a ground clearance equal to said lower body ground clearance. Said cavity is configured to contain said fluid. Said lower body height of said lower body is lower than said height of said tilted body. Said tilted body ground clearance is a minimum height to selectively mate with said vehicle. Said tilted body comprises said incline angle relative to said lower body. Said lower body is substantially horizontal. Said tilted body extends up, toward said front end, and does not bend again after bending up from a horizontal plane. Said lower body and said tilted body each comprise a substantially round cross-section having a width. Said width comprises a diameter of said circular cross-section. Said diameter of said lower body and said tilted body are equal when said cavity within said trailer is filled with said fluid, a fluid mass of said fluid is evenly distributed along said length of said trailer since said diameter of said lower body and said tilted body are equal.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
  a trailer 100,
  a tank 102,
  a lower body 104,
  a tilted body 106,
  a front end 110,
  a rear end 112,
  a wheel assembly 114,
  a portal 116,
  one or more legs 118,
  a first legs 118a,
  a second legs 118b,
  a plurality of wheels 120,
  a first wheels 120a,
  a second wheels 120b,
  a rear wheel fender 122,
  a rear bumper 124,
  a drain portal 126, a kingpin assembly 128,
a height 130,
a length 132,
a tilted body ground clearance 134,
a lower body height 136,
a lower body length 138,
a tilted body length 142,
a lower body ground clearance 144,
an incline angle 146

Figure 1A:
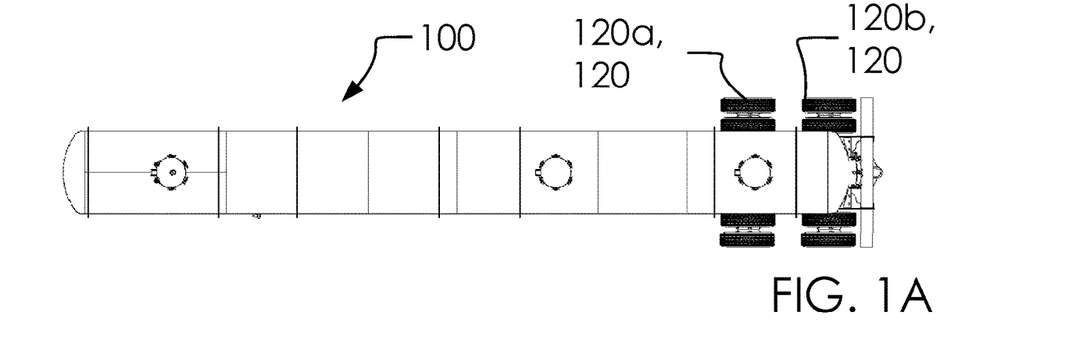
FIGS. 1A, 1B and 1C illustrate an elevated top side view and two front side views of a trailer 100.
Figure 1B:
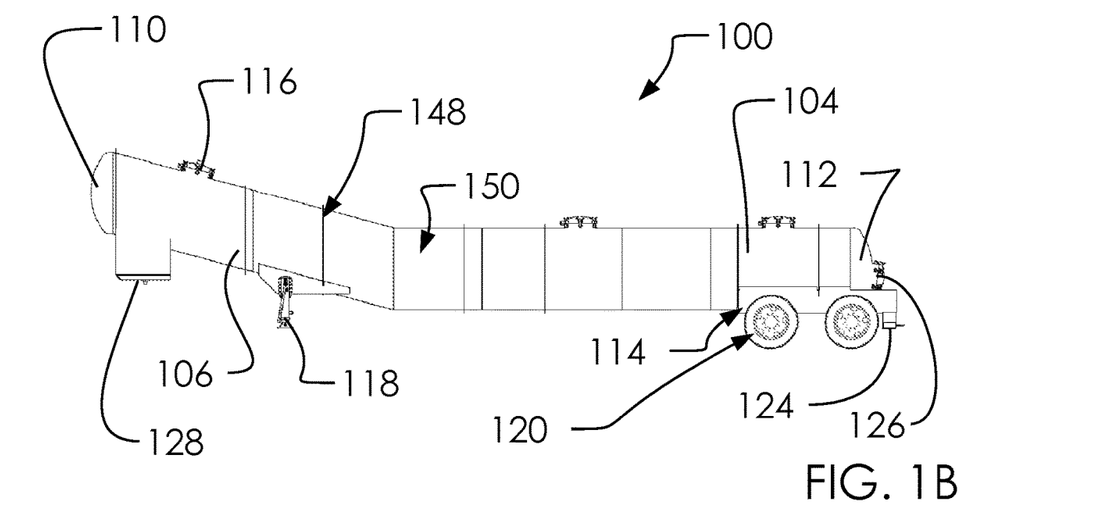
Figure 1C:
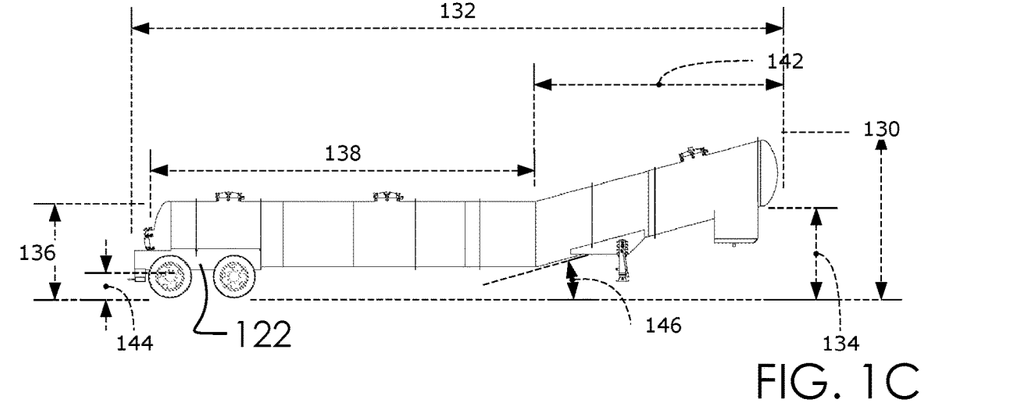

FIGS. 1A, 1B and 1C illustrate an elevated top side view and two front side views of said trailer 100.

In one embodiment, said trailer 100 can comprise said tank 102, said wheel assembly 114, said portal 116, said one or more legs 118, said plurality of wheels 120, said rear bumper 124, said drain portal 126, said kingpin assembly 128, said height 130 and said length 132.

In one embodiment, said tank 102 can comprise said lower body 104, said tilted body 106, said front end 110 and said rear end 112.

In one embodiment, said lower body 104 can comprise said lower body height 136, said lower body length 138 and said lower body ground clearance 144.

In one embodiment, said tilted body 106 can comprise said tilted body length 142, said tilted body ground clearance 134, and said incline angle 146.

In one embodiment, said wheel assembly 114 can comprise said plurality of wheels 120 which can comprise said first wheels 120a and said second wheels 120b. As illustrated, each of which can comprise an axel with multiple wheels on each, as is known in the art. In one embodiment, said one or more legs 118 can comprise said first legs 118a and said second legs 118b.

In one embodiment, said lower body 104 can be configured minimize said lower body ground clearance 144 to the fullest extent possible while ensuring said tank 102 passes all safety codes and government requirements for said lower body ground clearance 144. Accordingly, said trailer 100 is configured to attach to standard vehicles and pass safety standards while lowering its overall mass, as discussed herein.

In one embodiment, said lower body length 138 is greater than said tilted body length 142, as illustrated. Accordingly, the volume within said tank 102 is substantially contained within said lower body 104.

In one embodiment, said tilted body ground clearance 134 is a minimum height to accommodate standard vehicles and to mate with a trailer hitch system of such vehicles, as is known in the art.

In one embodiment, said tilted body 106 can comprise said incline angle 146 relative to said lower body 104. Said incline angle 146 can comprise approximately 15 degrees. In one embodiment, said incline angle 146 can increase or decrease depending on said length 132 of said tank 102, according to the rules of trigonometry.

Figure 2A:
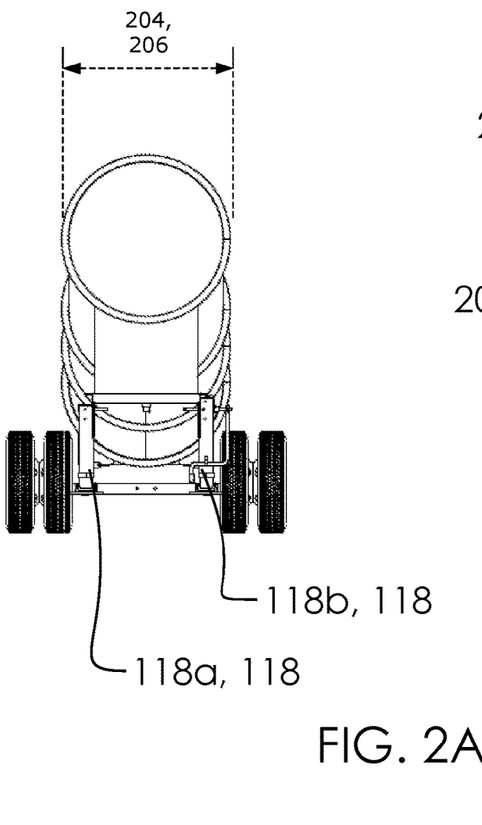
FIGS. 2A and 2B illustrate an elevated first and second side view of said trailer 100.
Figure 2B:
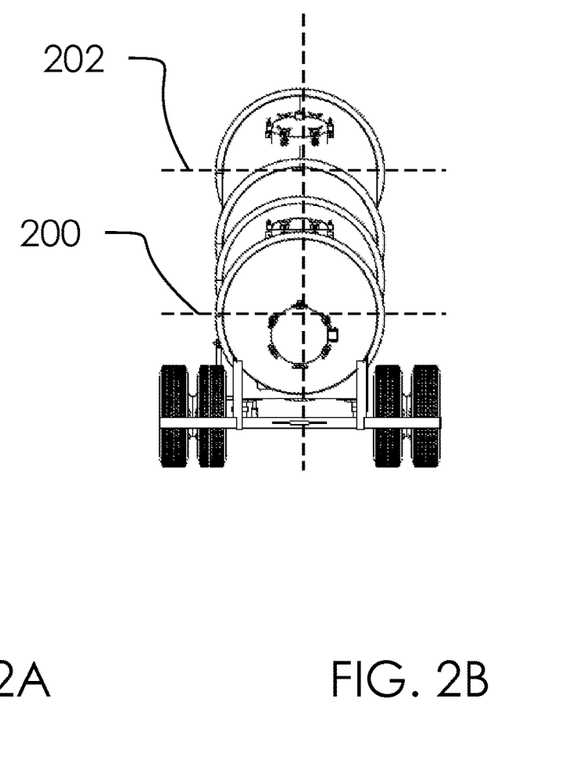

FIGS. 2A and 2B illustrate an elevated first and second side view of said trailer 100.

Said lower body 104 can comprise a lower center of gravity 200, said lower body height 136, said lower body length 138 and said lower body ground clearance 144; and said tilted body 106 comprises a tilted portion center of gravity 202, said height 130, said tilted body ground clearance 134 and said tilted body length 142.

Said lower body 104 and said tilted body 106 can each comprise a width 204. In one embodiment, said lower body 104 and said tilted body 106 can comprise a circular cross-section with said width 204 comprising a diameter 206.

Figure 3A:
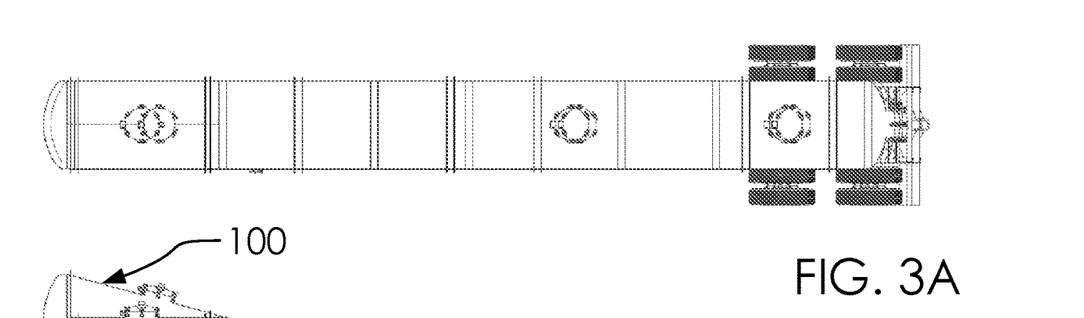
FIGS. 3A, 3B and 3C illustrate two elevated front side views of said trailer 100 overlaid with a dual level trailer 300, and one elevated side view of said dual level trailer 300.
Figure 3B:
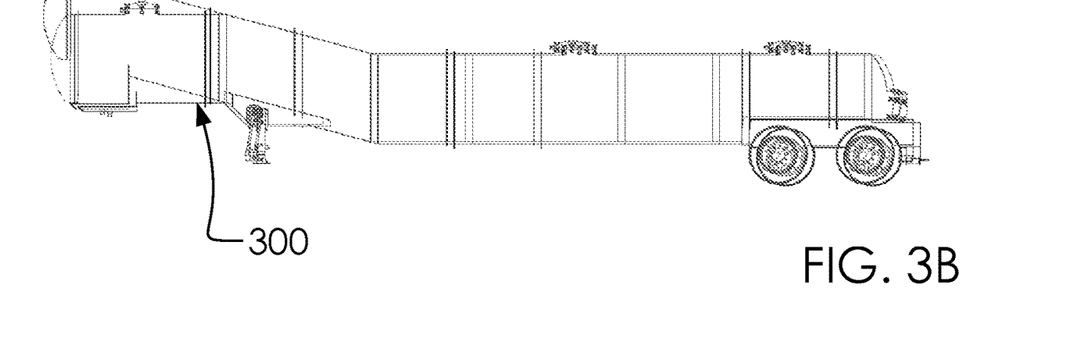
Figure 3C:
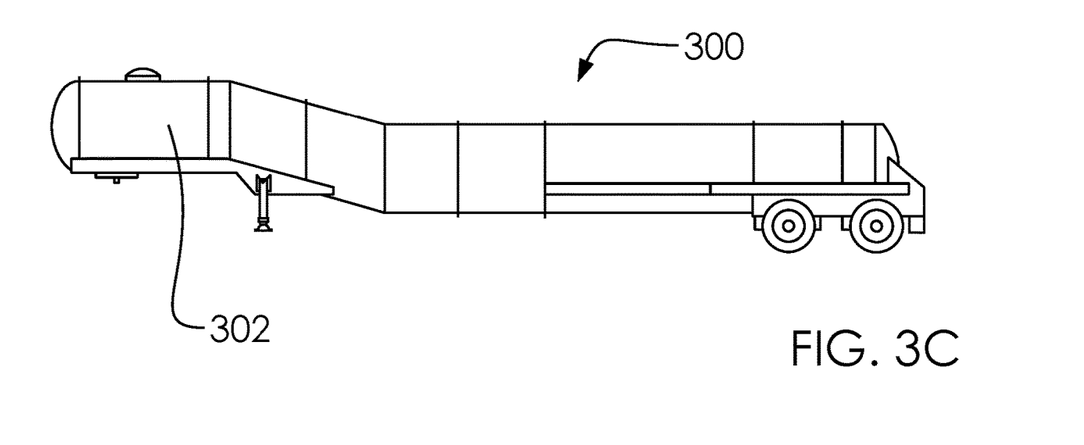

FIGS. 3A, 3B and 3C illustrate two elevated front side views of said trailer 100 overlaid with a dual level trailer 300, and one elevated side view of said dual level trailer 300.

The applicant previously filed on said dual level trailer 300 in U.S. patent application Ser. No. 15/400,783. Overlaid in FIGS. 3A-3B are the current disclosure and said dual level trailer 300.

As opposed to said dual level trailer 300, said trailer 100 can comprise said tilted body 106 without a second substantially horizontal section 302, as illustrated herein.

Figure 4A:
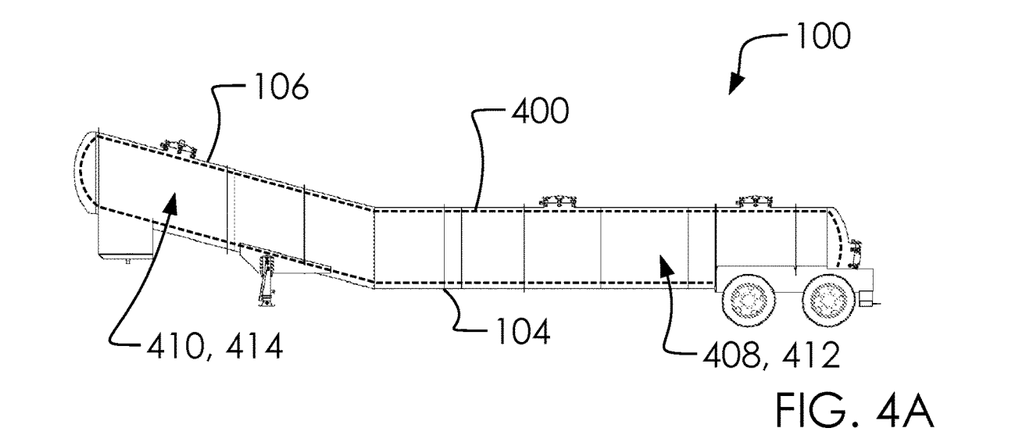
FIGS. 4A, 4B and 4C illustrate a front side view of said trailer 100 with a cavity 400.
Figure 4B:
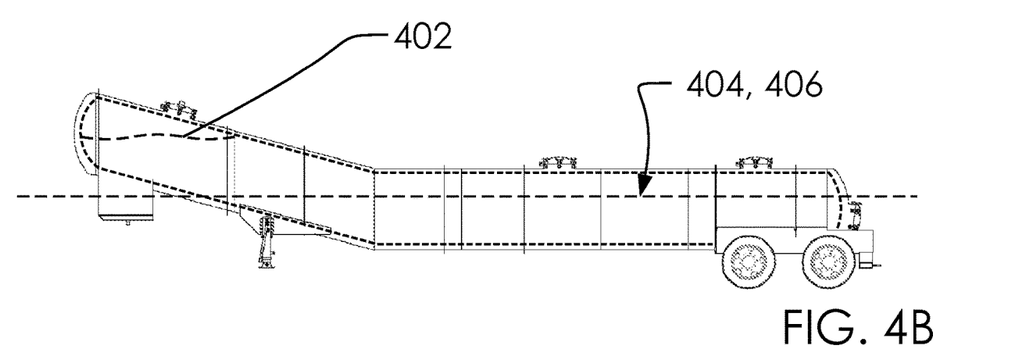
Figure 4C:
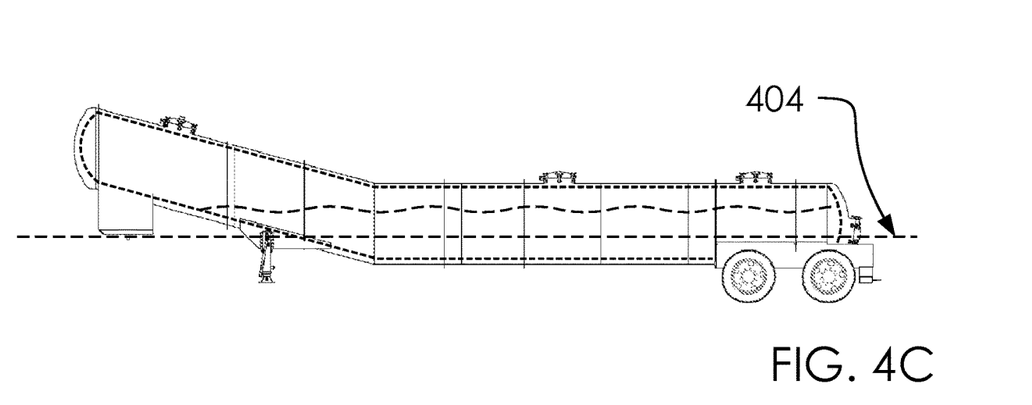

FIGS. 4A, 4B and 4C illustrate a front side view of said trailer 100 with a cavity 400.

In one embodiment, said tank 102 can comprise said cavity 400 configured to hold a fluid 402.

In one embodiment, said trailer 100 can be configured to hold a fluid mass 406 associated with said fluid 402 as low as possible. For example, since liquid fluids naturally settle in the lowest points within said cavity 400, such mass will naturally settle in said lower body 104 prior to said tilted body 106. Likewise, said fluid 402 will uniformly settle toward said rear end 112 due to the tilted configuration of said tilted body 106.

As illustrated in FIGS. 4B-4C, once said lower body 104 is filled completely with said fluid 402, said fluid 402 will progressively climb up said tilted body 106 and begin to lift a center of mass 404 for said trailer 100.

In one embodiment, said tank 102 can comprise a cross-section shape of an oval, circle, or an irregular shape. In one embodiment, said cavity 400 can comprise substantial cylinder shaped and can be hollow to form a portion of said cavity 400.

Said drain portal 126 can be provided to allow fluid to be input into said cavity 400.

Said cavity 400 can extend for the entire length of said trailer 100 or have separate partitions.

Said lower body 104 (having a lower center of gravity) can be a cylinder or other shape as known in the art; wherein, said lower body 104 can include a portion of said cavity 400 and can be substantially horizontal. Likewise, said cavity 400 within said tilted body 106 can be inclined at said incline angle 146.

Figure 5A:
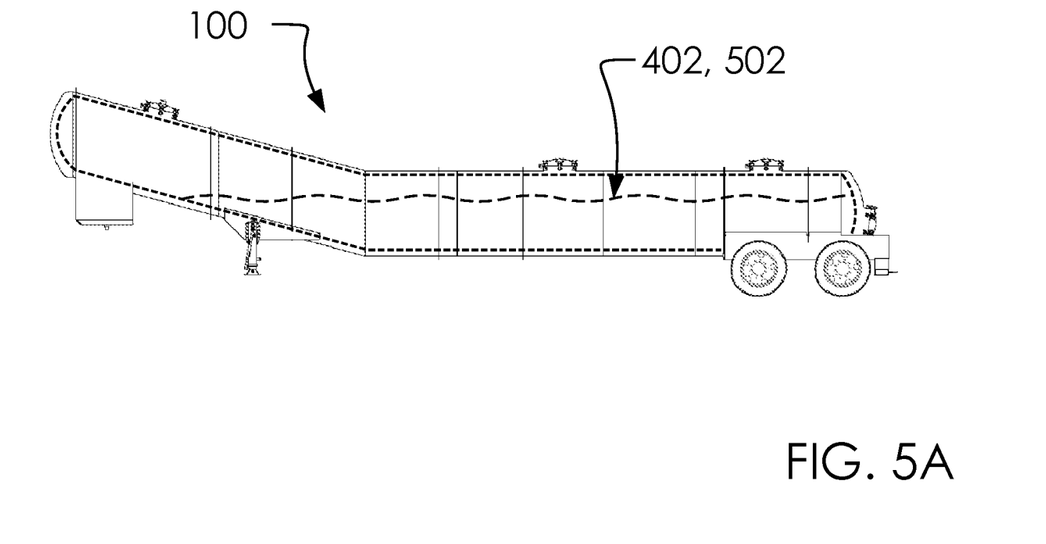
FIGS. 5A and 5B illustrate an elevated side view of said trailer 100 and said dual level trailer 300, with a fluid 402, each in a partially filled state 500.
Figure 5B:
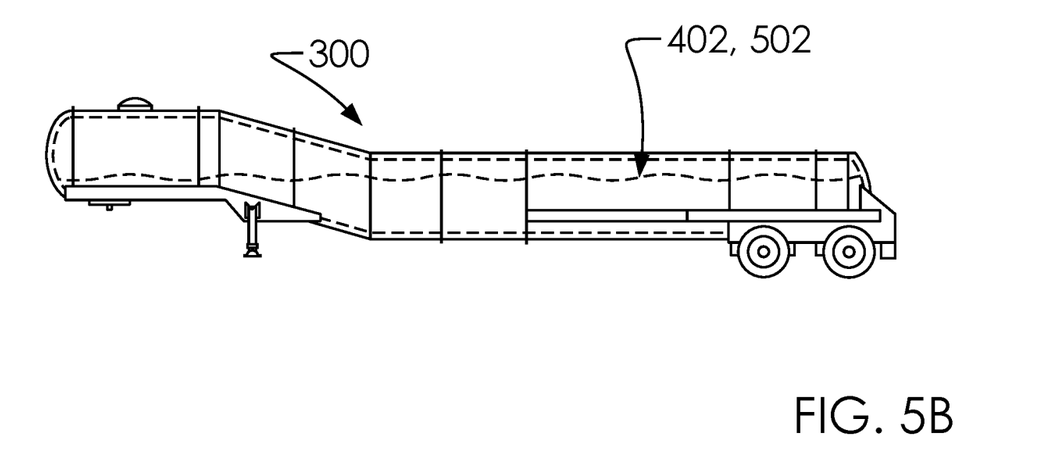

Said cavity 400 can comprise a lower cavity 408 in said lower body 104, an upper cavity 410 in said tilted body 106;

FIGS. 5A and 5B illustrate an elevated side view of said trailer 100 and said dual level trailer 300, with said fluid 402, each in a partially filled state 500.

Figure 6:
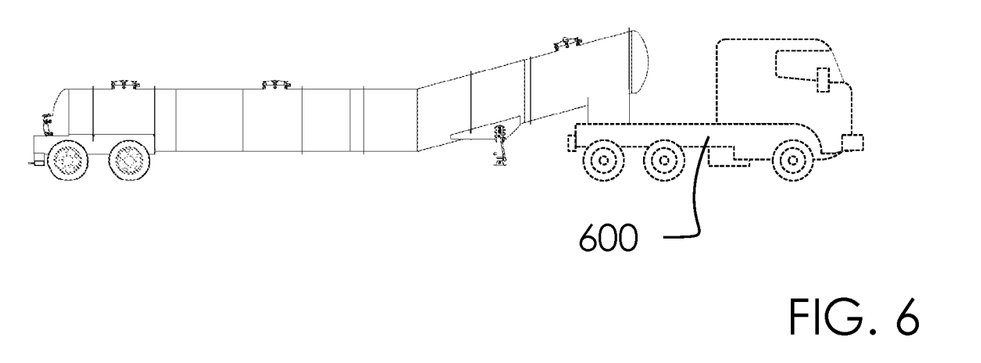
FIG. 6 illustrates an elevated side view of said trailer 100 with a vehicle 600.

FIG. 6 illustrates an elevated side view of said trailer 100 with a vehicle 600.

The following paragraphs are included for completeness of disclosure and are based on the original filed claims.

Said trailer 100 configured to lower an overall center of gravity thereof. Said trailer 100 comprises said tank 102, said wheel assembly 114, said height 130 and said length 132. Said tank 102 comprises said cavity 400 contained within said lower body 104, said tilted body 106, said front end 110 and said rear end 112. Said lower body 104 comprises said lower body height 136, said lower body length 138, said lower body ground clearance 144 and said lower center of gravity 200. Said tilted body 106 comprises said tilted body ground clearance 134, said tilted body length 142, said height 130 and said tilted portion center of gravity 202. Said tank 102 comprises said length 132, a height equal to said height 130 of said tilted body 106, and a ground clearance equal to said lower body ground clearance 144. Said cavity 400 can be configured to contain said fluid 402. Said lower body height 136 of said lower body 104 can be lower than said height 130 of said tilted body 106. Said tilted body ground clearance 134 is a minimum height to selectively mate with said vehicle 600. Said tilted body 106 comprises said incline angle 146 relative to said lower body 104. Said lower body 104 can be substantially horizontal. Said tilted body 106 extends up, toward said front end 110, and does not bend again after bending up from a horizontal plane.

Said incline angle 146 increases and decreases depending on said length 132 of said tank 102.

Said lower body 104 and said tilted body 106 each comprise a substantially round cross-section having said width 204. Said width 204 comprises said diameter 206 of said circular cross-section.

Said diameter 206 of said lower body 104 and said tilted body 106 can be equal when said cavity 400 within said trailer 100 can be filled with said fluid 402, said fluid mass 406 of said fluid 402 can be evenly distributed along said length 132 of said trailer 100 since said diameter 206 of said lower body 104 and said tilted body 106 can be equal.

Said fluid 402 comprises a gas fluid and said liquid fluid. Said cavity 400 comprises said lower cavity 408 in said lower body 104, said upper cavity 410 in said tilted body 106. Said fluid 402 naturally fills portions of said lower cavity 408 before filing portions of said upper cavity 410. Said tank 102 holds said fluid 402 lower and further back from said upper cavity 410 by holding a greater percentage of said fluid 402, having a higher density than a gas fluid situated above said fluid 402, within said lower cavity 408 than a lesser percentage of said upper cavity 410 within said upper cavity 410.

Said lower cavity 408 comprises a larger volume than said upper cavity 410. Said lower body length 138 of said lower body 104 can be larger than said tilted body length 142 of said tilted body 106. Said lower cavity 408 comprises A lower cavity volume 412. Said upper cavity 410 comprises an upper cavity volume 414. Said lower cavity volume 412 can be larger than said upper cavity volume 414.

Said tilted body 106 comprises said incline angle 146. Said incline angle 146 comprises approximately 15 degrees.

each of said lower body 104 and said tilted body 106 can be substantially cylindrical.

Said lower body 104 can be at a rear portion of said tank 102. Said tilted body 106 can be at a forward portion of said tank 102.

Said lower body 104 can be supported by said wheel assembly 114.

Said wheel assembly 114 comprises a plurality of wheels. Said trailer 100 comprises said one or more legs 118. Said one or more legs 118 configured to selectively extend and contract for support of said trailer 100.

Said tank 102 comprises A plurality of bands 148 and a plurality of sections 150.

Said cavity 400 can be sealed for selectively holding said fluid 402.

Said trailer 100 further comprises said kingpin assembly 128. Said kingpin assembly 128 of said trailer 100 can be mounted below said tilted body 106.

Said trailer 100 configured to lower an overall center of gravity thereof. Said trailer 100 comprises said tank 102, said wheel assembly 114, said height 130 and said length 132. Said tank 102 comprises said cavity 400 contained within said lower body 104, said tilted body 106, said front end 110 and said rear end 112. Said lower body 104 comprises said lower body height 136, said lower body length 138, said lower body ground clearance 144 and said lower center of gravity 200. Said tilted body 106 comprises said tilted body ground clearance 134, said tilted body length 142, said height 130 and said tilted portion center of gravity 202. Said tank 102 comprises said length 132, a height equal to said height 130 of said tilted body 106, and a ground clearance equal to said lower body ground clearance 144. Said cavity 400 can be configured to contain said fluid 402. Said lower body height 136 of said lower body 104 can be lower than said height 130 of said tilted body 106. Said tilted body ground clearance 134 is a minimum height to selectively mate with said vehicle 600. Said tilted body 106 comprises said incline angle 146 relative to said lower body 104. Said lower body 104 can be substantially horizontal. Said tilted body 106 extends up, toward said front end 110, and does not bend again after bending up from a horizontal plane. Said lower body 104 and said tilted body 106 each comprise a substantially round cross-section having said width 204. Said width 204 comprises said diameter 206 of said circular cross-section. Said diameter 206 of said lower body 104 and said tilted body 106 can be equal when said cavity 400 within said trailer 100 can be filled with said fluid 402, said fluid mass 406 of said fluid 402 can be evenly distributed along said length 132 of said trailer 100 since said diameter 206 of said lower body 104 and said tilted body 106 can be equal.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A trailer configured to lower an overall center of gravity thereof, wherein:
   said trailer comprises a tank, a wheel assembly, a height and a length;
   said tank comprises a cavity contained within a lower body, a tilted body, a front end and a rear end;
   said lower body comprises a lower body height, a lower body length, a lower body ground clearance and a lower center of gravity;
   said tilted body comprises a tilted body ground clearance, a tilted body length, said height and a tilted portion center of gravity;
   said tank comprises said length, a height equal to said height of said tilted body, and a ground clearance equal to said lower body ground clearance;
   said cavity is configured to contain a fluid;
   said lower body height of said lower body is lower than said height of said tilted body;
   said tilted body ground clearance is a minimum height to selectively mate with a vehicle;
   said tilted body comprises an incline angle relative to said lower body;
   said lower body is substantially horizontal; and said tilted body extends up, toward said front end, and does not bend again after bending up from a horizontal plane.

2. The trailer of claim 1, wherein:
said incline angle increases and decreases depending on said length of said tank.

3. The trailer of claim 1, wherein:
said lower body and said tilted body each comprise a substantially round cross-section having a width; and
said width comprises a diameter of said circular cross-section.

4. The trailer of claim 3, wherein:
said diameter of said lower body and said tilted body are equal; and
when said cavity within said trailer is filled with said fluid, a fluid mass of said fluid is evenly distributed along said length of said trailer since said diameter of said lower body and said tilted body are equal.

5. The trailer from claim 1, wherein:
the fluid comprises a gas fluid and said liquid fluid;
said cavity comprises a lower cavity in said lower body, an upper cavity in said tilted body;
said fluid naturally fills portions of said lower cavity before filing portions of said upper cavity; and
said tank holds said fluid lower and further back from said upper cavity by holding a greater percentage of said fluid, having a higher density than a gas fluid situated above said fluid, within said lower cavity than a lesser percentage of said upper cavity within said upper cavity.

6. The trailer from claim 5, wherein:
the lower cavity comprises a larger volume than said upper cavity;
said lower body length of said lower body is larger than said tilted body length of said tilted body;
said lower cavity comprises a lower cavity volume;
said upper cavity comprises an upper cavity volume; and
said lower cavity volume is larger than said upper cavity volume.

7. The trailer from claim 1, wherein:
the tilted body comprises said incline angle; and
said incline angle comprises approximately 15 degrees.

8. The trailer from claim 1, wherein:
each of the lower body and said tilted body are substantially cylindrical.

9. The trailer from claim 1, wherein:
the lower body is at a rear portion of said tank; and
said tilted body is at a forward portion of said tank.

10. The trailer from claim 9, wherein:
the lower body is supported by said wheel assembly.

11. The trailer from claim 1, wherein:
the wheel assembly comprises a plurality of wheels;
said trailer comprises one or more legs; and
said one or more legs configured to selectively extend and contract for support of said trailer.

12. The trailer from claim 1, wherein:
the tank comprises a plurality of bands and a plurality of sections.

13. The trailer from claim 1, wherein:
the cavity is sealed for selectively holding said fluid.

14. The trailer from claim 1, wherein:
the trailer further comprises a kingpin assembly; and
said kingpin assembly of said trailer is mounted below said tilted body.

15. A trailer configured to lower an overall center of gravity thereof, wherein:
said trailer comprises a tank, a wheel assembly, a height and a length;
said tank comprises a cavity contained within a lower body, a tilted body, a front end and a rear end;
said lower body comprises a lower body height, a lower body length, a lower body ground clearance and a lower center of gravity;
said tilted body comprises a tilted body ground clearance, a tilted body length, said height and a tilted portion center of gravity;
said tank comprises said length, a height equal to said height of said tilted body, and a ground clearance equal to said lower body ground clearance;
said cavity is configured to contain a fluid;
said lower body height of said lower body is lower than said height of said tilted body;
said tilted body ground clearance is a minimum height to selectively mate with a vehicle;
said tilted body comprises an incline angle relative to said lower body;
said lower body is substantially horizontal;
said tilted body extends up, toward said front end, and does not bend again after bending up from a horizontal plane;
said lower body and said tilted body each comprise a substantially round cross-section having a width;
said width comprises a diameter of said circular cross-section;
said diameter of said lower body and said tilted body are equal; and
when said cavity within said trailer is filled with said fluid, a fluid mass of said fluid is evenly distributed along said length of said trailer since said diameter of said lower body and said tilted body are equal.

16. A trailer configured to lower an overall center of gravity thereof, wherein:
the trailer comprises a tank, a wheel assembly, a height and a length;
the tank comprises a cavity contained within a lower body, a tilted body, a front end and a rear end;
the lower body comprises a lower body height, a lower body length, a lower body ground clearance and a lower center of gravity;
the tilted body comprises a tilted body ground clearance, a tilted body length, the height and a tilted portion center of gravity;
the tank comprises the length, a height equal to the height of the tilted body, and a ground clearance equal to the lower body ground clearance;
the cavity is configured to contain a fluid;
the lower body height of the lower body is lower than the height of the tilted body;
the tilted body ground clearance is a height to selectively mate with a vehicle;
the tilted body comprises an incline angle relative to the lower body;
the lower body is substantially horizontal;
the tilted body extends up, toward the front end, and does not bend again after bending up from a horizontal plane; and
the incline angle increases and decreases depending on the length of the tank.

* * * * *